(12) United States Patent
Cambonie

(10) Patent No.: US 6,408,319 B1
(45) Date of Patent: Jun. 18, 2002

(54) ELECTRONIC DEVICE FOR COMPUTING A FOURIER TRANSFORM AND CORRESPONDING CONTROL PROCESS

(75) Inventor: Joel Cambonie, LaCombe de Lancey (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/216,563

(22) Filed: Dec. 18, 1998

(30) Foreign Application Priority Data

Dec. 19, 1997 (FR) ............................................. 97 16115

(51) Int. Cl.⁷ .............................................. G06F 17/14
(52) U.S. Cl. ........................................ 708/406; 708/408
(58) Field of Search ................................. 708/406, 408, 708/404

(56) References Cited

U.S. PATENT DOCUMENTS

| 5,313,413 | A | * | 5/1994 | Bhatia et al. | 708/408 |
| 5,808,925 | A | * | 9/1998 | Ito et al. | 708/406 |
| 6,061,705 | A | * | 5/2000 | Hellberg | 708/408 |
| 6,081,821 | A | * | 6/2000 | Hopkinson et al. | 708/406 |
| 6,098,088 | A | * | 8/2000 | He et al. | 708/406 |

OTHER PUBLICATIONS

Basoglu, C et al., "An efficient FFT algorithm for superscalar and VLIW processor architectures", Real–Time Imaging, Dec. 1997, Academic press, UK, vol. 3, No. 6, pp. 441–453.

Blair, G.M., "A review of the discrete Fourier transform, Part 2. Non–radix algorithms, real transforms and noise", Electronics & Communication Engineering Journal, Oct. 1995, UK, vol. 7, No. 5, pp. 187–194.

Hui, C.C.W. et al., "A 64–Point Fourier Transform Chip For Video Motion Compensation Using Phase Correlation", IEEE Journal of Solid–State Circuits, vol. 31, No. 11, Nov. 1996, pp. 1751–1761.

Swartzlander, E.E. Jr. et al., "A radix 4 delay commutator for fast Fourier transform processor implementation", IEEE Journal of Solid–State Circuits, Oct. 1984, USA, vol. SC–19, No. 5, pp. 702–709.

* cited by examiner

Primary Examiner—David H. Malzahn
(74) Attorney, Agent, or Firm—Lisa K. Jorgenson; Allen, Dyer, Doppelt, Milbrath & Gilchrist, P.A.

(57) ABSTRACT

An electronic device for computing a Fourier transform having a pipeline architecture includes at least one processing stage with a radix equal to 4. Each processing stage includes elementary processing for performing process operations for Fourier transforms of size equal to 4 on data blocks. Each processing stage also includes an elementary storage that includes a random access memory. In particular, the random access memory is a single-access memory with a storage capacity equal to 3N/4 data bits. The size of the data block processed by this stage is equal to N.

41 Claims, 12 Drawing Sheets

FIG.5
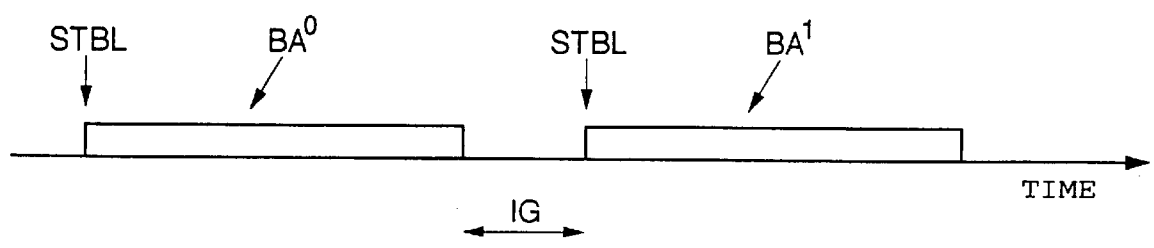
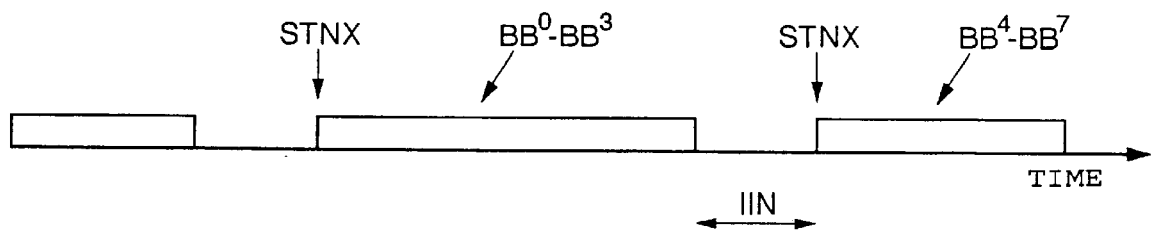

ELECTRONIC DEVICE FOR COMPUTING A FOURIER TRANSFORM AND CORRESPONDING CONTROL PROCESS

FIELD OF THE INVENTION

The invention relates to the field of electronic computing devices, and, more particularly, to an electronic device having a pipeline architecture for computing a Fourier transform, and a related method.

BACKGROUND OF THE INVENTION

Numerous dedicated Fourier transform implementations, including those programmed on signal processing microprocessors, have been disclosed. Most of these implementations use a variation of the Cooley-Tukey algorithm, which makes it possible to reduce the number of arithmetic operations required for computing the Fourier transform. This algorithm is well known to one skilled in the art.

In particular, the Cooley-Tukey algorithm reduces the computation of a fast Fourier transform of initial size $r^p$ into that of r Fourier transforms of size $r^{p-1}$, and of supplementary complex multiplications and additions. According to the terminology customarily used by one skilled in the art, r represents the radix. Iterative repetition of this reduction produces the computation of Fourier transforms of size r. These computations can easily be carried out, especially if r is chosen equal to 2 or 4. The Cooley-Tukey algorithm uses a computation graph that takes on the appearance of a structure of a general butterfly shape, and is commonly referred to simply as a butterfly. This appearance is well known to one skilled in the art Several hardware architectures are possible for implementing a butterfly-shaped computation structure. A first approach includes a hardware operator capable of performing a butterfly type computation per butterfly of the graph. However, such an approach may be used only for the implementation of Fourier transforms of small size.

A second approach includes just a single hardware operator of the butterfly type, and performing in succession the computations corresponding to all the butterflies of all the stages of the graph. Such an approach has the drawback of requiring a very fast hardware operator. An input memory separate from the memory is required for writing the intermediate computation results. This avoids access conflicts when a data block enters the operator while the previous block is still being processed. It is therefore necessary to provide two memories of N0 complex words, where N0 denotes the initial size of the Fourier transform. This leads to an overall circuit of considerable size, especially when N0 is large.

An intermediate approach includes a hardware operator of the butterfly type per stage of the graph, as well as a storage element. This includes delay lines or shift registers, whose function is to input the data to the operator in the right order while aware of the butterflies of the graph of the relevant stage. Such architectures are termed serial or pipeline according to terminology well known by one skilled in the art.

More precisely, an electronic device for computing a Fourier transform having a pipeline architecture comprises a plurality of successive processing stages connected in series between the input and the output of the device by internal data paths. These stages respectively comprise processing means and storage means. The processing means performs processing operations for Fourier transforms of smaller elementary sizes than the initial size on blocks of data whose sizes are reduced in succession from one stage to the next.

The term initial size of the Fourier transform is understood here and in the remainder of the text to mean the size of the blocks received as input to the device by the first stage. The elementary sizes of the Fourier transforms performed by the various stages may be identical and equal to the radix of the Fourier transform; i.e., a Fourier transform with uniform radix. However, they may be different from one stage to another, as in the case of Fourier transforms with mixed radix.

Examples of pipeline architectures are described in an article by Bi and Jones, entitled "A Pipeline FFT Processor for Word-Sequential Data", IEEE Transactions on Acoustic Speech and Signal Processing, vol. 37, No. 12, December 1989, pages 1982–1985, and in an article by Bidget et al., entitled "A Fast Single-Chip Implementation of 8192 Complex Point FFT", IEEE Journal of Solid-State Circuits, vol. 30, No. 3, March 1995, pages 300–305.

The storage means described in these known architectures includes delay lines which are very simple elements to manage. They have the advantage of being generally compact, and use three transistors per stored bit. However, these elements are not always available as standard cells in ordinary libraries of components used in defining and designing integrated circuits. Furthermore, their electrical characteristics are dependent on the technology used, so that the architecture of the circuit must be carefully re-examined each time the technology advances. Such architectures use delay lines whose storage capacity is equal to 2N0 for an initial size of a Fourier transform equal to N0, while the minimum theoretical storage capacity is equal to N0.

SUMMARY OF THE INVENTION

The invention provides a different approach to the above described problem. An object of the invention is to provide a device having a pipelined architecture for computing a Fourier transform. The device operates with very high clock frequencies while minimizing the memory size required, which may equal the theoretical minimum. Another object of the invention is to provide such a device using conventional and readily available storage elements, regardless of the implemented technology.

Yet another object of the invention is to provide an electronic device for computing a Fourier transform capable of being easily tested with full scan test methods, which are well known to one skilled in the art. Another object of the invention is to take account of any guard interval separating the various symbols to be processed by Fourier transform, especially in terrestrial applications of digital television which use OFDM (Orthogonal Frequency Division Multiplex) coding for transmission.

The invention therefore provides an electronic device having a pipelined architecture for computing a Fourier transform. The electronic device comprises a plurality of successive processing stages connected in series between the input and the output of the device. These stages respectively comprise processing means and storage means. The processing means performs processing operations for Fourier transforms of smaller elementary sizes than the initial size on blocks of data whose sizes are reduced in succession from one stage to the next.

The electronic device comprises at least one radix 4 processing stage. The radix 4 processing stage includes elementary processing means performing processing operations for Fourier transforms of elementary size equal to 4 on blocks of data. An elementary storage means comprising a random access memory is also included in the radix 4 processing stage. In particular, the random access memory comprises a single-access static memory.

The use of a random access memory, whether dual-access (dual port) or single-access (single port), requires specific management for addressing so the intermediate data in the memory can be stored and redelivered in the right order. This management is more complex when the radix of the Fourier transform is greater than 2, and in particular, when it is equal to 4. The single access permits either write-access or read-access at each cycle of the internal clock of the device. This approach goes against all current teachings on the subject, which provides for the use of delay lines or shift registers.

The use of random access memories enables the storage capacity to be reduced stage by stage. Therefore, the total storage capacity of the device is reduced relative to the storage capacity required when using delay lines. Such components are more readily available, particularly, in their simplest form, i.e., a single-access static memory. Random access memories are independent of the technology used, and are compatible with very high clock frequencies.

Various internal hardware architectures for the elementary processing means may be used for implementing the processing operations of the butterfly type within each stage. However, it is preferable for the elementary processing means of the radix 4 stage to respectively perform N/4 processing operations of the butterfly type on N/4 distinct groups of four data bits of each data block processed by this stage. The size of each data block equals N.

The elementary processing means make provisions to call each datum (or operand) of the block received once only to perform the various processing operations of the butterfly type. This process is distinguishable from the hardware operator used in the previously discussed article by Bidget et al., where the later makes provisions to call each operand several times to perform the processing operations. The elementary processing means of a radix 4 stage comprises eight complex adders and one multiplier. In the prior art, delay lines are used and provisions are made for only six adders and one multiplier. The elementary processing means, according to the present invention, stores fewer intermediate data and contribute, in combination with the use of a random access memory, to further minimize the stage-by-stage storage capacity.

According to one embodiment of the invention, the storage capacity of a radix 4 processing stage is equal to 3N/4 data bits, with N being the size of the data blocks processed by this processing stage. In other words, the invention makes provisions to store in each stage only three quarters of the data received by this stage. This provides a total storage capacity for the device equal to N0, with N0 being the initial size of the blocks processed by the first stage of the device, i.e., the initial size of the Fourier transform. There is a factor of 2 savings in storage capacity using a radix 4 processing stage compared to he prior art devices which use delay lines.

A problem associated with devices that compute Fourier transforms is the dynamic range of the intermediate and output data with respect to the dynamic range of the input data. The term dynamic range is understood to mean the number of bits used to represent the data, including the sign bit. Since the hardware operators of the butterfly type perform complex multiplications and additions, it is unrealistic to save multiplication after multiplication. As a result, it is customary to work with a constant dynamic range. A constant dynamic range is provided by representing the input, the intermediate and the output data using the same number of bits.

Although the dynamic range is constant, the value of the dynamic range of the intermediate data cannot be known in advance. The value of the dynamic range of a datum refers to the range of values within which the datum lies, e.g., between −0.5 and +0.5 or between −0.05 and +0.05 etc. A first approach includes a priori globally extending the dynamic range of the data. That is, the necessary dynamic range is estimated a priori over the data output by the circuit to not lose too much accuracy in the significant bits. This assumes that no saturation occurs with regard to the internal computation, and the size of the input data words are subsequently increased by the estimated number of extra bits. The intermediate data and the output data will also be represented with words of this size. Accordingly, this leads to an increase in the size of the internal data paths of the circuit.

When the initial size of the Fourier transform is not too large, it is possible to use all the radix 4 processing stages of the device, each having a storage capacity equal to three quarters of the data received by the corresponding stage. When the initial size of the Fourier transform is large, the a priori estimation of the dynamic range required may lead to an overly large increase in the size of the internal data paths. This requires numerous processing stages, which results in an increase in the area of the circuit. Therefore, it is advantageous to provide radix 4 processing stages of a second type when the initial size of the Fourier transform is large. The second type processing stage has elementary processing means comprising means for determining the dynamic range of the data of each block processed, and for performing a realignment of these data with regard to the dynamic range. In operation, this realignment involves estimating the maximum value of the data of the block, and in dividing each datum of the block by this maximum value. However, to perform such a realignment of the data, it is necessary for the radix 4 processing stages of the second type to comprise elementary storage means having a storage capacity equal to N. N is the size of the data blocks processed by this stage.

Although the storage capacity of the radix 4 stage of a second type is greater than the storage capacity of a radix 4 stage of a first type, the storage capacity equal to N nevertheless remains less than that of a radix 4 stage of the prior art using delay lines. The prior art also carries out a realignment of the data, such as described in the article by Bidget et al. No realignment of the data is performed in the first type radix 4 stage. In the multistage devices for computing Fourier transforms, the first stage, i.e., the input stage, does not generally comprise any means for realigning the data since it is generally assumed that the incoming data are already correctly aligned. However, in certain applications requiring very high accuracy in the data, it is possible to use the means for realigning the data actually being incorporated into the first stage.

Regardless of the type of the radix 4 stage, it is possible for the elementary storage means of this stage to consist entirely of a random access memory. However, it is particularly advantageous to associate with this random access memory one or more levels of registers or latches mutually connected in series with the memory. This separates the memory from the operative part of the stage, and allows for the use of automatic tools for generating test vectors. Such automatic test methods are referred to as full scan methods, and are well known to one skilled in the art. These automatic test methods include loading all the latches, and in performing computations, and in rewriting the data to the latches to carry out the test.

It is particularly advantageous with respect to a radix 4 processing stage of the first type (i.e., without realignment of the data) for the elementary storage means to comprise a single-access random access memory and n registers mutually connected in series with the memory. The memory is then able to store N/4−(n−1) words of three data bits, while each register is able to store one word of three data bits. For the processing stages of the second type (i.e., with realignment of the data), the elementary storage means also comprises a single-access random access memory and n registers mutually connected in series with the memory. However, the memory is then able to store N/4−(n−1) words of four data bits while each register is able to store one word of four data bits.

According to one embodiment of the invention and regardless of the type of stage, each radix 4 processing stage comprises an input for sequentially receiving at the frequency of a first clock signal the N data bits of a current block. The data is ordered within four consecutive segments each containing N/4 data bits. Each datum of a segment forms a group of four data bits together with the counterpart data bit of the other three segments. The elementary processing means of the stage comprises an adder/subtracter module for performing, at each cycle of the first clock signal, a processing operation of the butterfly type on each of the groups formed. This processing operation derives successive groups of four intermediate data respectively ordered within four consecutive intermediate segments. The elementary processing means furthermore comprises a multiplier module for multipling, at each cycle of the first clock signal, the intermediate data by predetermined multiplier coefficients. The processing stage also comprises control means for delivering to the elementary storage means the data contained in at least the first three segments of the current block as they are received. The control means are also able to respectively substitute some of the stored data of the current block with the intermediate data contained in the last three intermediate segments. At each cycle of the first clock signal, the control means also redeliver to the elementary storage means the information removed from the storage means and not used by the adder/subtracter module or the multiplier module.

The control means in a processing stage of the first type (i.e., no realignment of the data) deliver to the elementary storage means the data contained in the first three segments as they are received. The data contained in the last segment are not stored. The control means also respectively substitute the stored data with the intermediate data contained in the last three intermediate segments as the data contained in the fourth segment are received.

The control means in a processing stage of the second type (i.e., realignment of the data) deliver to the elementary storage means the data contained in the four segments of the current block as they are received. The control means also respectively substitute the stored data of the last three segments of the current block with the intermediate data contained in the last three intermediate segments as the data contained in the first segment of the next block are received.

According to another embodiment of the invention, the elementary storage means comprises a first register connected to the output of the memory, and a second register connected to the input of the memory. This embodiment is regardless of the type of radix 4 processing stage. The output of the first register is connected firstly to the input of the second register by a first controllable multiplexer, secondly to the input of the adder/subtracter module, and thirdly to the input of the multiplier module by a second controllable multiplexer. The output of the adder/subtracter module is connected to the input of the first register by the first multiplexer, and to the input of the multiplier module by the second multiplexer. Therefore, the control means comprises two multiplexers, as well as a first counter modulo N (write counter). The first counter modulo N is clocked by the first clock signal, and reinitializes on reception of the first datum of each block. The first counter modulo N also controls the first multiplexer. The control means also comprises a second counter modulo N (read counter) clocked by the first clock signal, and reinitializes on transmission of the first output datum of the stage. The second counter modulo N also controls the second multiplexer. Furthermore, the elementary processing means of the stage comprises means for addressing the memory comprising a counter modulo N/4−1, i.e., N/4−(n−1) with n=2 for the two registers.

The invention also provides a process for controlling a radix 4 processing stage for computing a Fourier transform of a device having a pipelined architecture. For each block of data received as input to the stage, only three quarters of the data of the block are stored in storage means comprising a random access memory.

According to yet another embodiment of the invention, the stage sequentially receives the N data bits of the block. The data are ordered within four consecutive segments each comprising N/4 data bits. Each datum of a segment forms a group of four data bits together with the counterpart data of the other three segments. The data contained in the first three segments are stored in the storage means as they are received. As the data contained in the fourth segment are received, a processing operation of the butterfly type is performed on each of the groups to derive successive groups of four intermediate data bits respectively ordered within four consecutive intermediate segments. The stored data are replaced respectively with the intermediate data contained in the last three intermediate segments.

BRIEF DESCRIPTION OF THE DRAWINGS

Other advantages and characteristics of the invention will emerge on examining embodiments of the invention, which are in no way limiting, and on examining the appended drawings in which:

FIG. 5 illustrates schematically input and output data flows of the device taking into account a guard interval, according to the present invention;

DETAILED DESCRIPTION OF THE PREFERRED EMBODIMENTS

Figure 1:
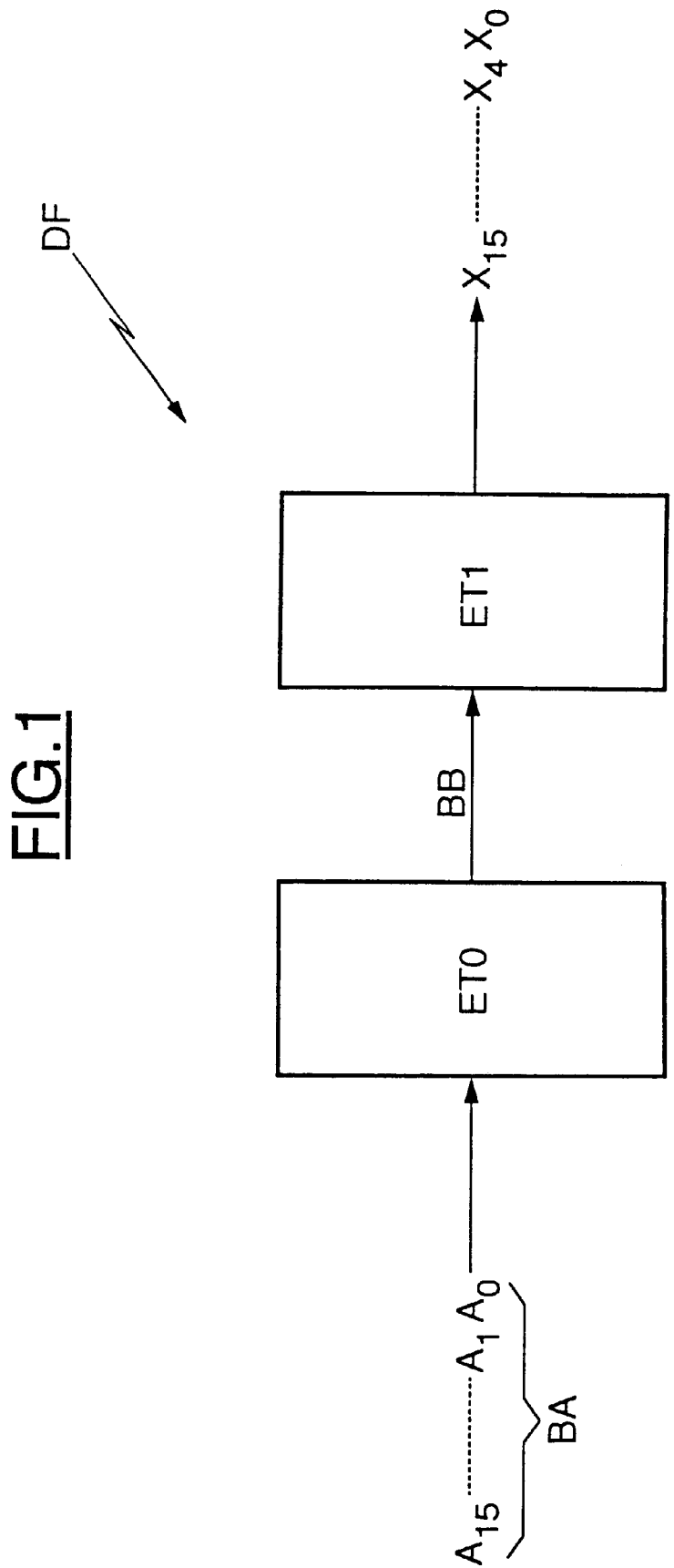
FIG. 1 is a schematic overview of a device with two processing stages, according to the present invention.

In FIG. 1, the reference DF denotes a device for computing a Fourier transform. The device has a pipelined architecture capable of performing a Fourier transform of initial size equal to 16, and comprises two radix 4 processing stages ET0 and ET1. The input stage ET0 receives streams of symbols or data blocks BA respectively comprising sixteen data bits $A_0$–$A_{15}$. The output of the stage ET0 delivers successive blocks BB of four data bits which are processed in the stage ET1. This stage ET1 delivers the output symbol $X_{15} \ldots X_4 X_0$ corresponding to the input symbol BA.

Generally, the size of the data block received as input is equal to N for a radix 4 processing stage. This data block can be split into four segments of N/4 data bits each, temporally received consecutively. The first segment is formed of the data bit $A_i^K$, the second segment is formed of the data bit $A_{N/4+i}^K$, the third segment is formed of the data bit $A_{N/2+i}^K$, and the fourth segment is formed of the data bit $A_{3N/4+i}^K$. In each data bit, i varies from 0 to N/4−1, and represents the number of processing operations of the butterfly type performed in the stage on each data block received. K represents the $K^{th}$ block received by the stage.

Furthermore, one skilled in the art is aware that if s denotes the rank of the relevant stage, N is equal to $N0/4^s$, where N0 denotes the initial size of the Fourier transform, i.e., the size of each symbol received by the input stage. If the relevant stage is the first, the $K^{th}$ block corresponds to the $K^{th}$ symbol received. In contrast, if the relevant stage is not the first (rank s different from 0), each symbol input to the device is split up recursively within each stage into $4^s$ blocks K (K varying from 0 to $4^s-1$).

Figure 2:
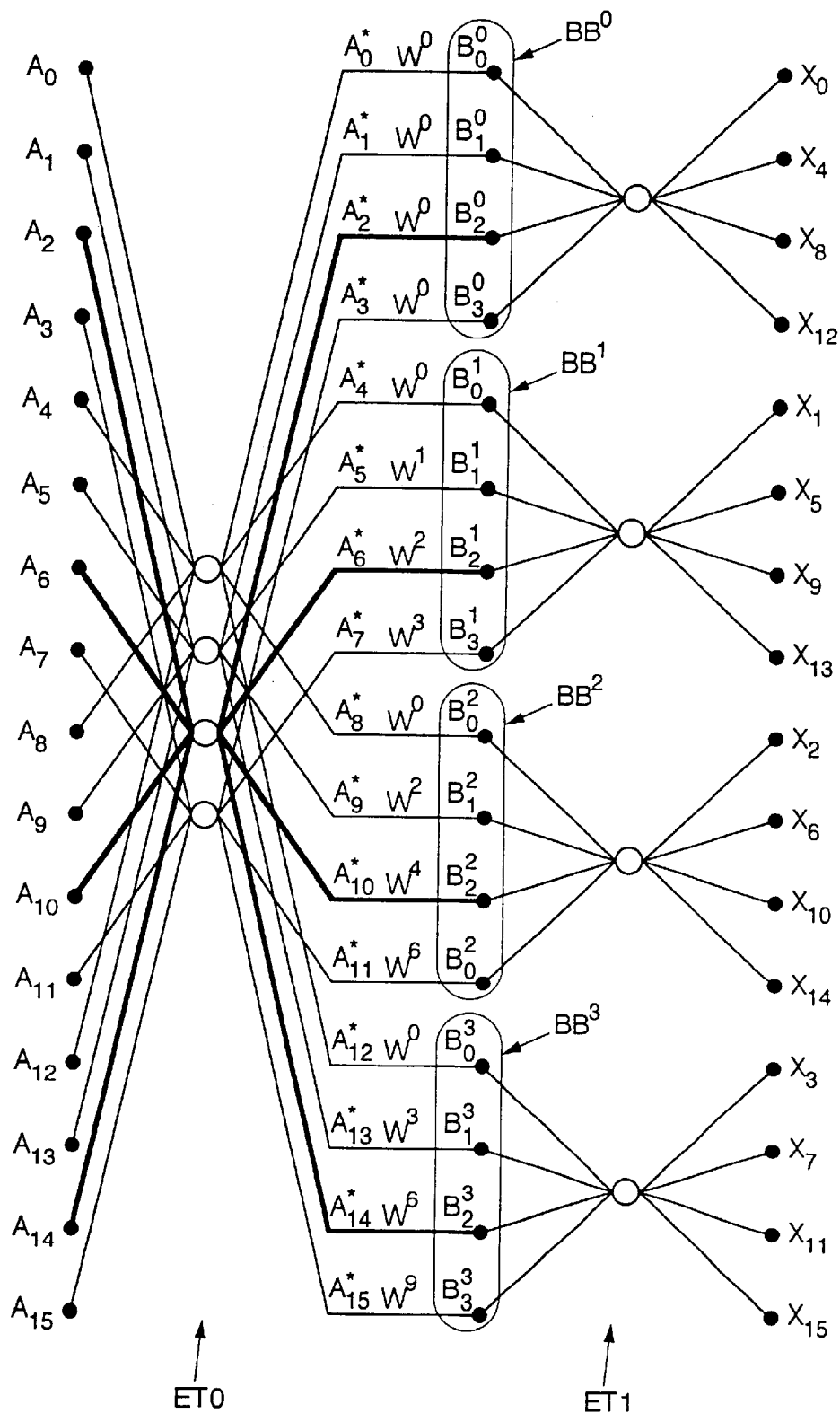
FIG. 2 illustrates butterfly type processing operations performed in the device of FIG. 1.

FIG. 2 illustrates the particular case of the sixteen data bits (N=16) of each block received by the stage ET0. The radix 4 processing stage then performs N/4 processing operations of the butterfly type on N/4 distinct groups of four data bits formed respectively by a datum of the first segment and the counterpart data bit of the other three segments. The stage ET0 performs a first processing operation of a butterfly type on the group formed of the data bits $A_0$, $A_4$, $A_8$ and $A_{12}$, and a second processing operation of the butter-fly type is performed on a second group of data formed of the data bits $A_1$, $A_5$, $A_9$ and $A_{13}$, etc. This is continued up to a fourth processing operation of a butterfly type on the fourth group of data formed of the data bits $A_3$, $A_7$, $A_{11}$, and $A_{15}$.

The result of these processing operations of the butterfly type are intermediate data likewise ordered within four intermediate segments, each containing N/4 intermediate data bits. More precisely, the first intermediate segment contains the intermediate data bit $A_i^{K*}$, the second intermediate segment contains the intermediate data bit $A_{N/4+i}^{K*}$, the third intermediate segment contains the data bit $A_{N/2+i}^{K*}$, and the fourth intermediate segment contains the data bit $A_{3N/4+i}^{K*}$.

These intermediate data are obtained according to the following formulas (I) to (IV):

$$A_i^{K*} = A_i^K + A_{N/4+i}^K + A_{N/2+i}^K + A_{3N/4+i}^K \quad \text{(I)}$$

$$A_{N/4+i}^{K*} = A_i^K - A_{N/4+i}^K + A_{N/2+i}^K - A_{3N/4+i}^K \quad \text{(II)}$$

$$A_{N/2+i}^{K*} = A_i^K - j A_{N/4+i}^K - A_{N/2+i}^K + j A_{3N/4+i}^K \quad \text{(III)}$$

$$A_{3N/4+i}^{K*} = A_i^K - j A_{N/4+i}^K - A_{N/2+i}^K - j A_{3N/4+i}^K. \quad \text{(IV)}$$

In these formulas, j denotes the complex number whose square is equal to −1, and i varies from 0 to N/4−1. These intermediate data are next multiplied by predetermined coefficients $W^0$ (that is to say 1), $W^i$, $W^{2i}$ and $W^{3i}$ according to the relevant segments. These coefficients are conventional complex coefficients well known to one skilled in the art. After multiplying by these coefficients W, four blocks $BB^{4K}$, $BB^{4K+1}$, $BB^{4K+2}$, $B_i^{4K+3}$ respectively containing N/4 output data bits, $B_1^{4K}$, $B_i^{4K+1}$, $B_i^{4K+2}$ and $B_i^{4K+3}$ are provided at the output of the processing stage, with i varying from 0 to N/4−1. All the blocks BB will then be processed consecutively by the elementary processing of the second stage ET1, each of these blocks are regarded as an input symbol for this second stage. Thus, in FIG. 2, the elementary processing means will perform in succession a butterfly type processing operation on the four data bits of each input block BB to obtain intermediate data B*. The output data, in the present case, is the result of the Fourier transform of the input data A.

Figure 3:
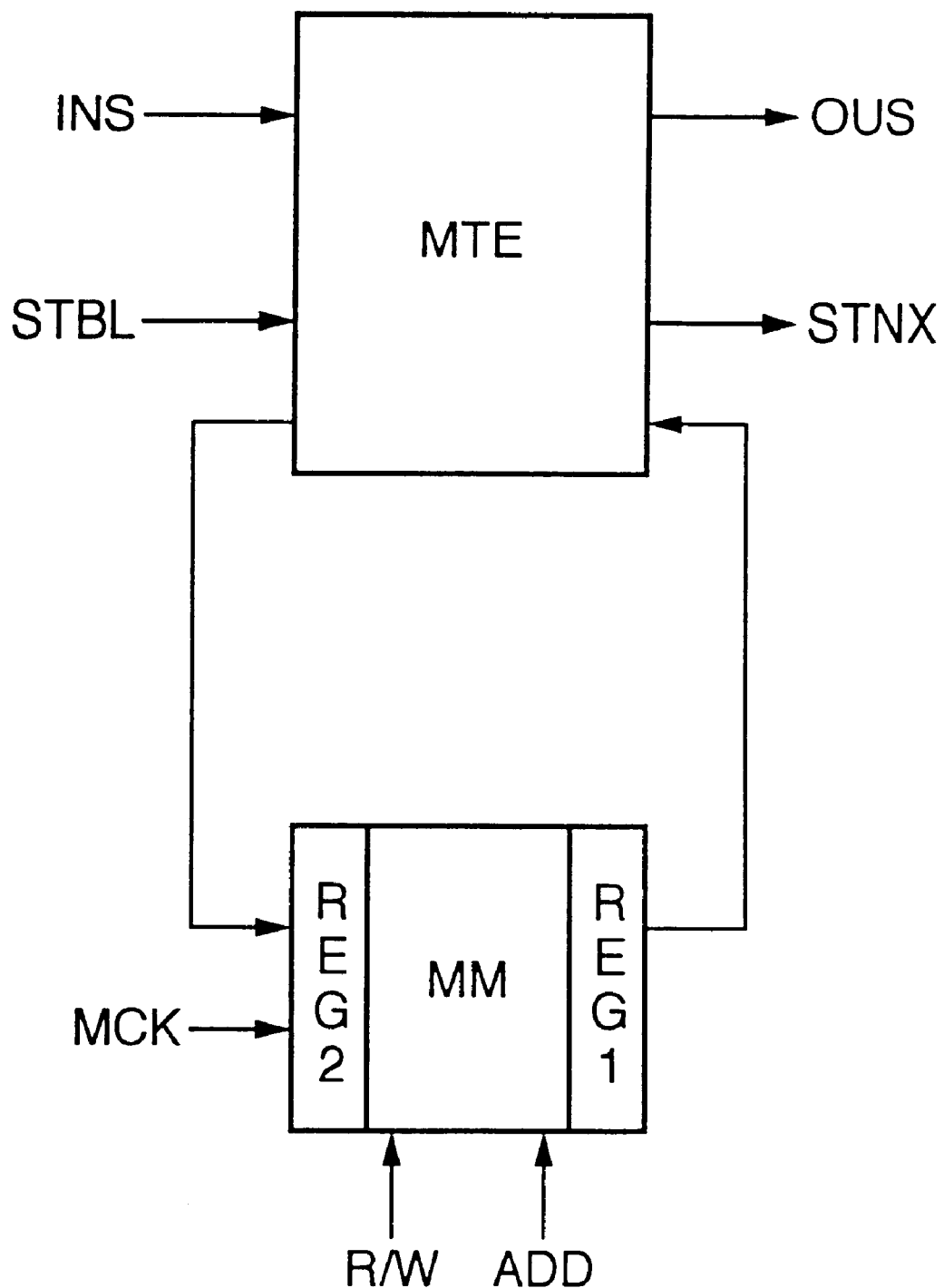
FIG. 3 is a schematic representation of the hardware architecture of a processing stage in the device of FIG. 1.

In FIG. 3, the reference MTE denotes the elementary processing means of a radix 4 processing stage of the device DF. The elementary processing means MTE comprises an input terminal for receiving the flow INS of the various data blocks originating either from exterior to the device if the relevant stage is the first, or from the previous stage. If the relevant stage is the first, the various blocks represent the various symbols on which the Fourier transform will be performed. The data contained in each of the blocks received are delivered at the frequency of a first clock signal SMCK. The elementary processing MTE is clocked by a base clock signal MCK whose frequency is either twice as large as the frequency of the signal SMCK, or four times as large. The latter is dependent on whether, during each cycle of the signal SMCK, the elementary processing MTE receives either the real and/or imaginary part of each datum. The output data stream OUS (after Fourier transform processing) is provided to an output terminal of this processing stage.

Furthermore, the elementary processing MTE receives a first monitoring signal STBL originating either from outside the device if the relevant state is the first, or from the previous stage. This signal STBL indicates reception of the first datum of a block, for example, when it passes to the "1" state. Likewise, the elementary processing MTE delivers a second monitoring signal STNX to the following stage which indicates, for example, when it passes to the "1" state. Transmission of the first output datum arises from the processing of the input block. The signal STBL received by the current stage is then the signal STNX transmitted by the previous stage.

The radix 4 processing stage comprises elementary storage means comprising a single-access random access static memory MM looped back to the elementary processing MTE. The loop back is by a first main register or latch REG1 connected to the output of the memory MM, and by a second main register or latch REG2 connected to the input of the memory MM. The memory MM is write/read controlled by a signal R/W. When this signal equals "1" for example, a read is involved and when it equals "0", a write is involved. Furthermore, the memory is addressed by an address pointer ADD. Either a write-access or a read-access of the memory MM is performed at each cycle of the base clock signal MCK. Therefore, a read-access followed by a write-access of the memory is performed at each cycle of the first clock signal SMCK.

Figure 4:
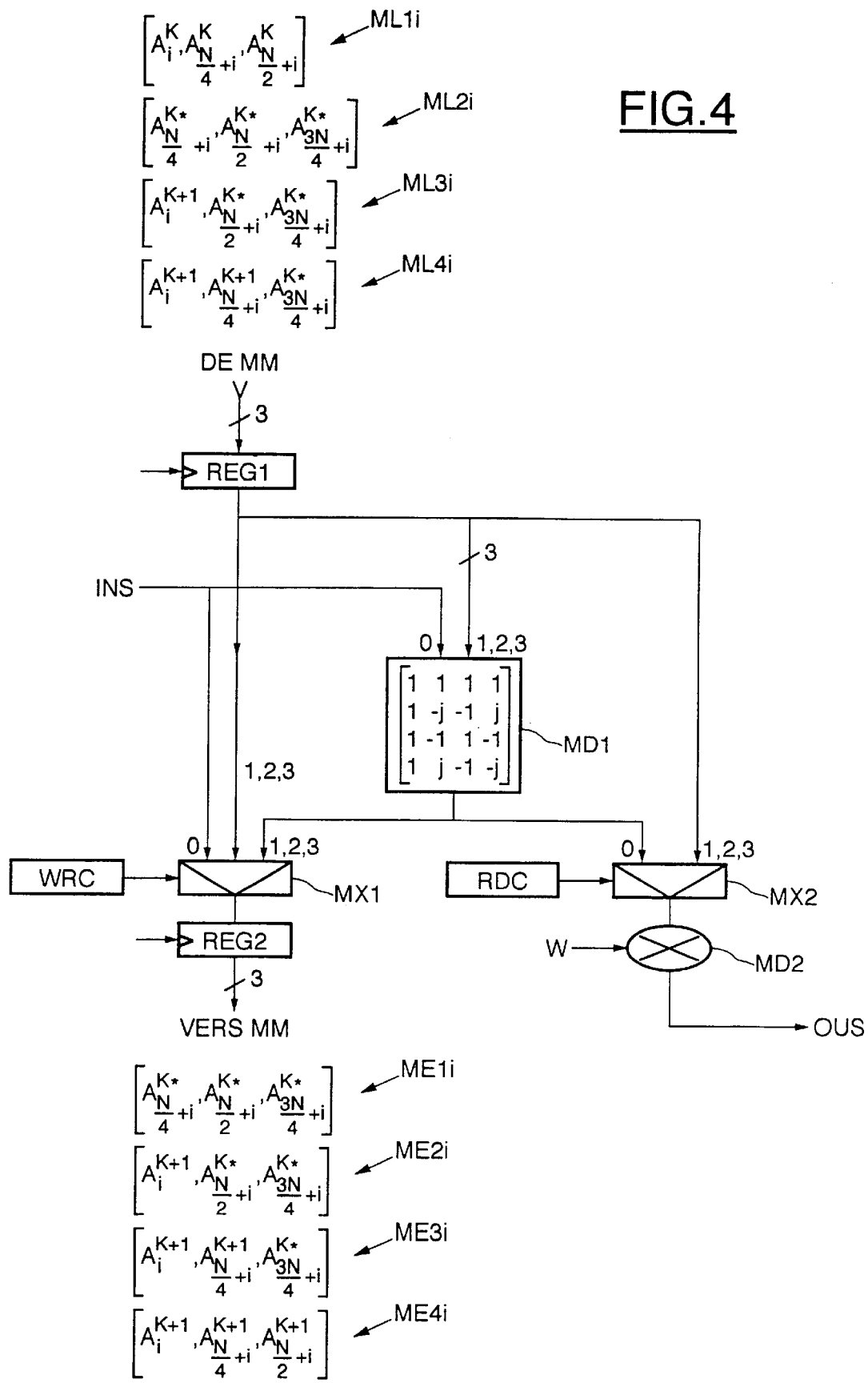
FIG. 4 illustrates in greater detail the schematic representation of FIG. 3.

Referring to FIG. 4, it is assumed that the radix 4 processing stage is of a first type, within which no computations of the dynamic range of the data are performed. In this case, the storage capacity of the elementary storage means MTE of the processing stage is equal to 3N/4 data bits. In view of the two levels of pipeline, i.e., registers REG1 and REG2, the storage capacity of the memory is equal to N/4−1 words of three data bits. Each register REG1, REG2 is able to store a word of three data bits. The memory MM can therefore take the form of a matrix of N/4−1 rows and 3 columns. The elementary processing means MTE comprises an adder/subtracter module MD1 for computing the intermediate data according to formulas (I–IV) above. The elementary processing means MTE also comprises a multiplier module MD2 for multipling the intermediate data by the appropriate coefficients W. The output of the multiplier module provides the output data stream OUS.

The four outputs 0, 1, 2, 3 of the module MD1 respectively deliver the intermediate data bits $A_i^{K^*}$, $A_{N/4+i}^{K^*}$, $A_{N/2+i}^{K^*}$, $A_{3N/4+i}^{K^*}$ of the four intermediate segments. The input terminal of the stage, as well as the three outputs 1, 2, 3 of the first register REG1 are respectively connected to the four inputs 0, 1, 2, 3 of the adder module MD1. The input terminal of the stage receives the stream INS of input data. The input terminal of the stage is linked to the input 0 of a first four-input multiplexer MX1 whose three outputs are linked to the three inputs of the register REG2. The other three inputs 1, 2 and 3 of the first multiplexer MX1 are linked to the three outputs 1, 2, 3 of the register REG1, and also to the three outputs 1, 2 and 3 of the module MD1. Output 0 of the module MD1 is linked to input 0 of a second multiplexer MX2. The second multiplexer MX2 includes four inputs, and an output connected to the input of the multiplier module MD2. The other three inputs 1, 2 and 3 of the second multiplexer are connected to the three outputs of the first register REG1.

The data of each input block are indexed by a first counter (write counter) WRC modulo N. which counts from 0 to N−1 at the frequency of the first clock signal SMCK, for example. Likewise, the output data are indexed from 0 to N−1 by a second counter (read counter) RDC modulo N, which counts from 0 to N−1 at the frequency of the first clock signal, for example. The rising to 1 of the first monitoring signal STBL indicates the reception of the first datum of the block, and reinitializes the counter WRC. The rising to 1 of the second monitoring signal STNX signals the transmission of the first output datum, and reinitializes the read counter RDC. Furtheremore, the second monitoring signal STNX passes to the 1 state when the first counter WRC reaches the value 3N/4−1.

The write counter WRC controls the first multiplexer MX1. While the counter WRC is counting from 0 to N/4−1, the three inputs 1, 2, 3 of register REG2 respectively receive the datum available at the input of the stage, and the values available at outputs 2 and 3 of register REG1. While the counter WRC is counting from N/4 to N/2−1, the three inputs 1, 2, 3 of register REG2 respectively receive the value available at output 1 of register REG1, the datum available at the input of the processing stage, and the value available at output 3 of register REG1.

When the counter WRC is counting from N/2 to 3N/4−1, the inputs 1, 2 and 3 of register REG2 respectively receive the value provided at output 1 of register REG1, the value provided at output 2 of register REG1, and the datum available at the input of the processing stage. Finally, when the counter WRC is counting from 3N/4 to N−1, the three inputs 1, 2 and 3 of register REG2 respectively receive the values provided by outputs 1, 2 and 3 of module MD1. The register REG2 then stores the three data bits which will be written at the next clock cycle to the memory MM.

The counter RDC controls the multiplexer MX2. While the counter RDC is counting from 0 to N/4−1, the multiplier module MD2 receives the value provided by output 0 of module MD1. When the counter RDC is counting from N/4 to N/2−1, the module MD2 receives the value available at output 1 of register REG1. When the counter RDC is counting from N/2 to 3N/4−1, the module MD2 will receive the value available at output 2 of register REG1. When the counter RDC is counting from 3N/4 to N−1, the module MD2 will receive the value available at output 3 of register REG1.

The values of the sines and cosines of the complex coefficients W, and the values used in the module MD2 are stored in a read-only memory addressed by the read counter RDC. The address signal ADD for the memory MM is provided by a counter modulo N/4−1 (not represented for purposes of simplification), and counts from 0 to N/4−2 at the frequency of the first clock signal SMCK, for example.

Writing to the memory MM, as well as the mode of operation of the elementary processing means MTE of this stage will now be described in more detail while still referring to FIG. 4. It is also assumed that a guard interval does not separate two consecutive symbols input to the computing device.

It is now assumed that the memory MM contains the data bits $A_i^K$, $A_{N/4+i}^K$, and $A_{N/2+i}^K$ of the first three segments of the block K, which have been stored as they are received, i.e., as the counter WRC counts from 0 to 3N/4−1. Here and in the remainder of the text, i varies from 0 to N/4−1 at the frequency of the counter WRC. While the counter WRC is counting from 3N/4 to N−1, the stage receives in succession as input the data bit $A_{3N/4+i}^K$ of the fourth segment of the block. However, these data are not stored in the memory MM, and are used with the counterpart data bit of the first three segments to compute the intermediate data bits $A_i^{K^*}$, $A_{N/4+i}^{K^*}$, $A_{N/2+i}^{K^*}$ and $A_{3N/4+i}^{K^*}$ of the four intermediate segments. However, the intermediate data bit $A_i^{K^*}$ of the first intermediate segment are not stored in the memory MM, and are forwarded directly to the multiplier module MD2.

In contrast, as the data of the fourth segment of the block K are received, the data stored in the memory MM are replaced respectively by the intermediate data computed by the module MD1. The data of the fourth segment relate to the first three segments of the block K. The data computed by the module MD1 relate to the last three intermediate segments. In other words, referring again to FIG. 4, while the counter is counting from 3N/4 to N−1, the words ML1i are removed from the memory while the words ME1i are stored in the memory via register REG2.

In the next step, the words ML2i (i varying from 0 to N/4−1) corresponding to the previous write words ME1i are removed in succession from the memory. This is while the counter WRC is counting from 0 to N/4−1, which corresponds to receiving data of the first segment of block K+1. The intermediate data of the second segment of block K are provided to the multiplier module MD2. Write words ME2i containing the intermediate data of the last two segments of block K, and also the data of the first segment of block K+1 are stored in the memory MM. The data of the first segment of block K+1 have been substituted for the intermediate data of the second segment of block K.

A similar mode of operation is performed while the counter is counting from N/4 to N/2−1 with the read words ML3 and ME3 (i varying from 0 to N/4−1), and then with the read words ML4 and ME4 while the counter is counting from N/2 to 3N/4−1. On completion of this step, the memory MM again contains the data of the first three segments of block K+1, and a new complete write/read cycle can begin.

In some applications, especially in digital television receivers, the various symbols received as input to the computing device DF are spaced apart by a guard interval IG (FIG. 5). The guard interval IG comprises a greater or lesser number of data, which can be the duplicate of some data of the symbol following the guard interval. FIG. 5 illustrates a stream of symbols received by a radix 4 input stage. Each symbol is a block of sixteen data bits. The top part of FIG. 5 represents the first two blocks $BA^0$ and $BA^1$ separated by the guard interval IG. The first respective data of each block are identified by the rising to 1 of the signal STBL. The bottom part of FIG. 5 illustrates the corresponding output blocks BB. The blocks $BB^0$–$BB^3$ referenced by the signal STNX correspond to block $BA^0$, while blocks $BB^4$–$BB^7$ correspond to block $BA^1$. Block $BB^4$ is separated from block $BB^3$ by data IIN, which have been computed with the guard interval, and which therefore have no physical significance.

Figure 6A:
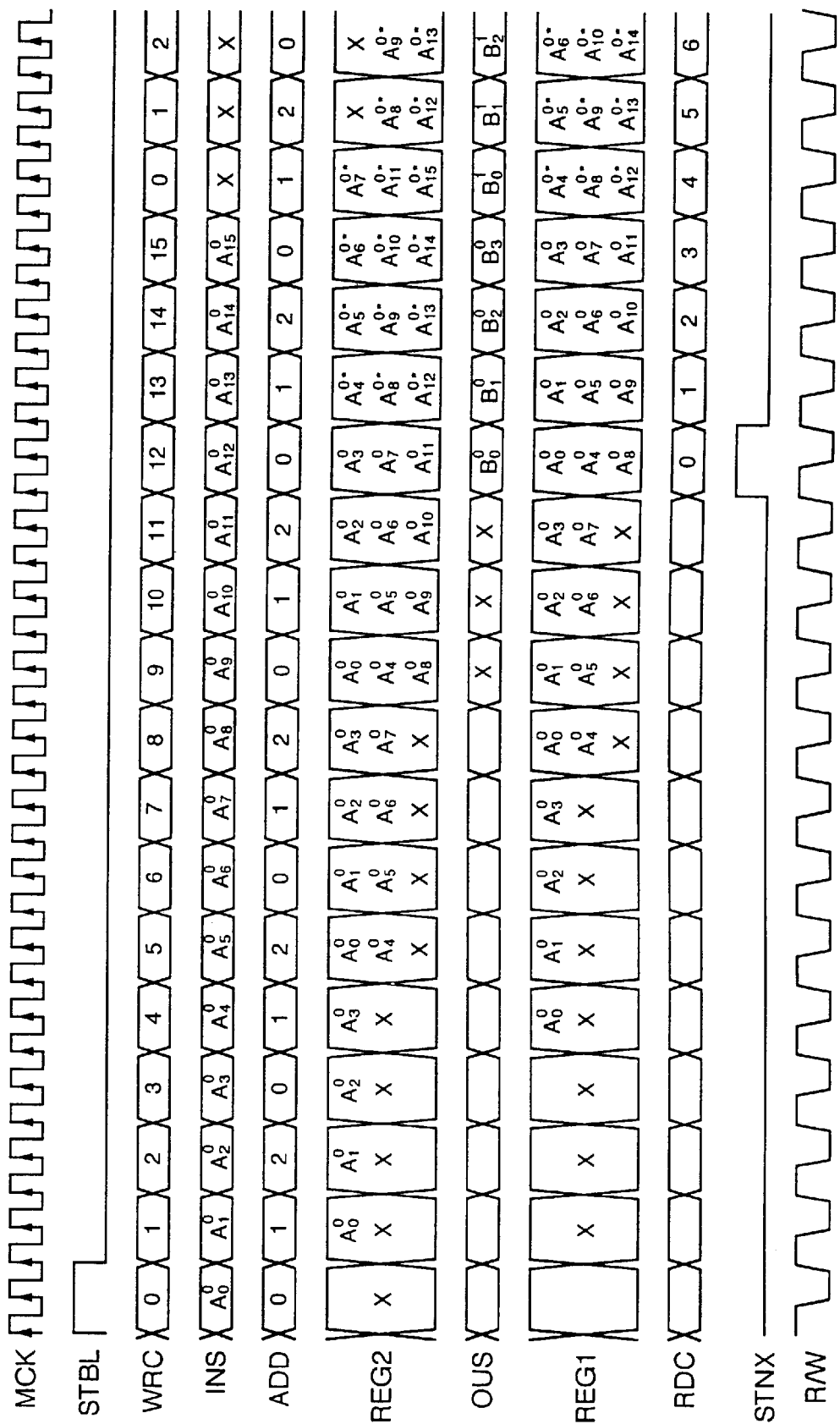
FIGS. 6a and 6b are timing diagrams taking into account a guard interval between the various symbols to be processed, according to the present invention.
Figure 6B:
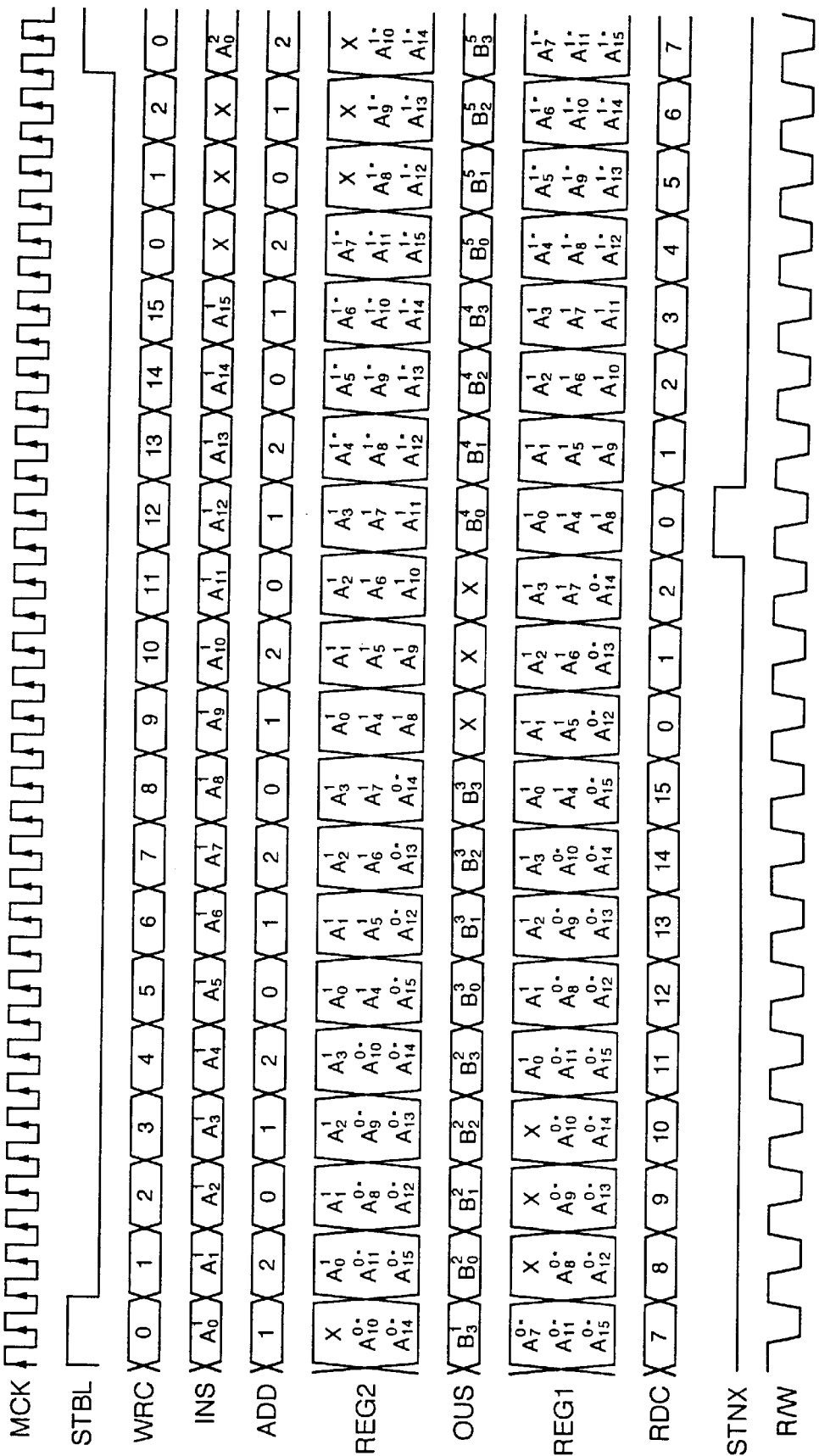
Figure 7A:
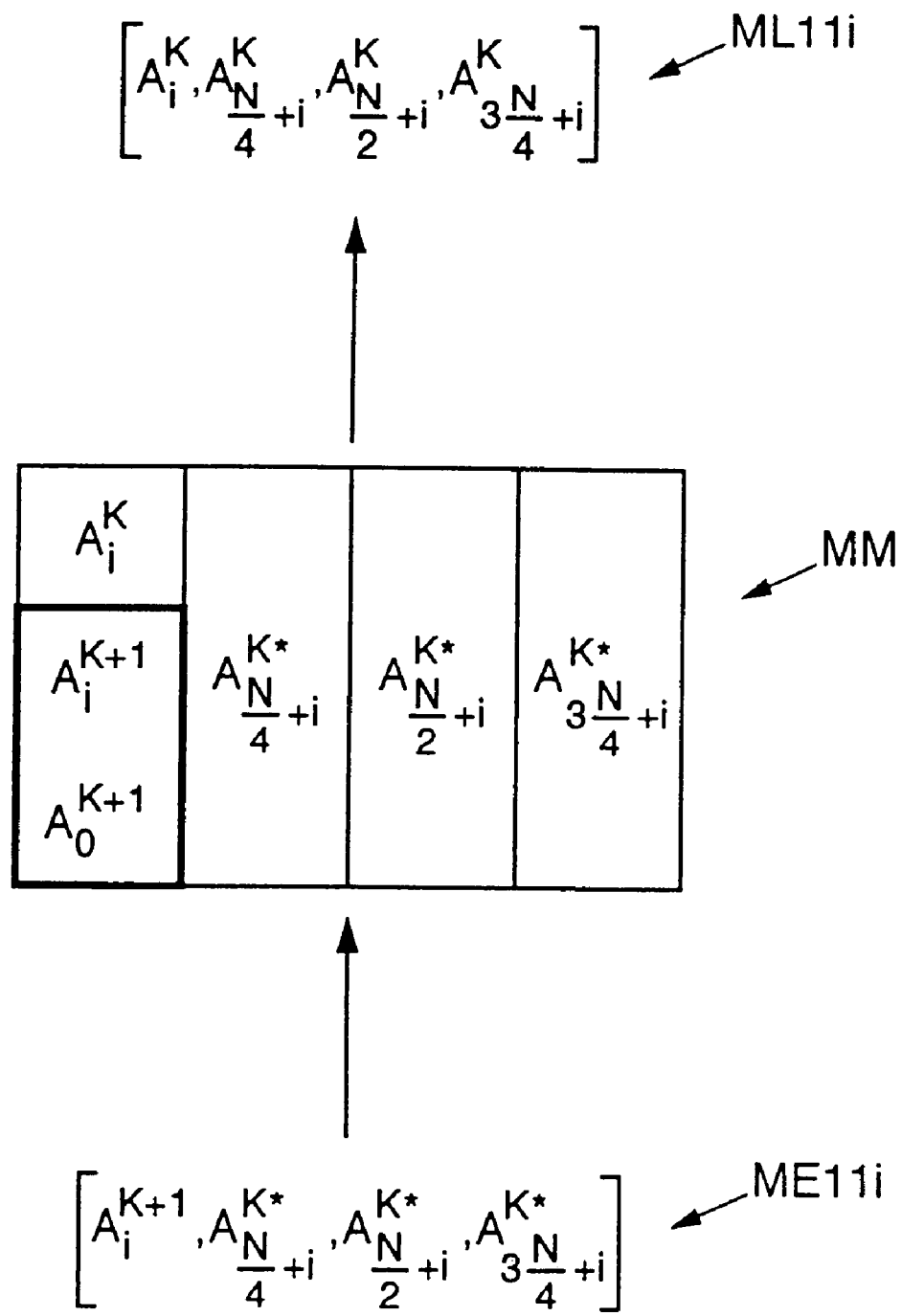
FIGS. 7a to 7d diagrammatically illustrate the configuration of a memory of a device, including a realignment of data within a radix 4 processing stage, according to the present invention.
Figure 7B:
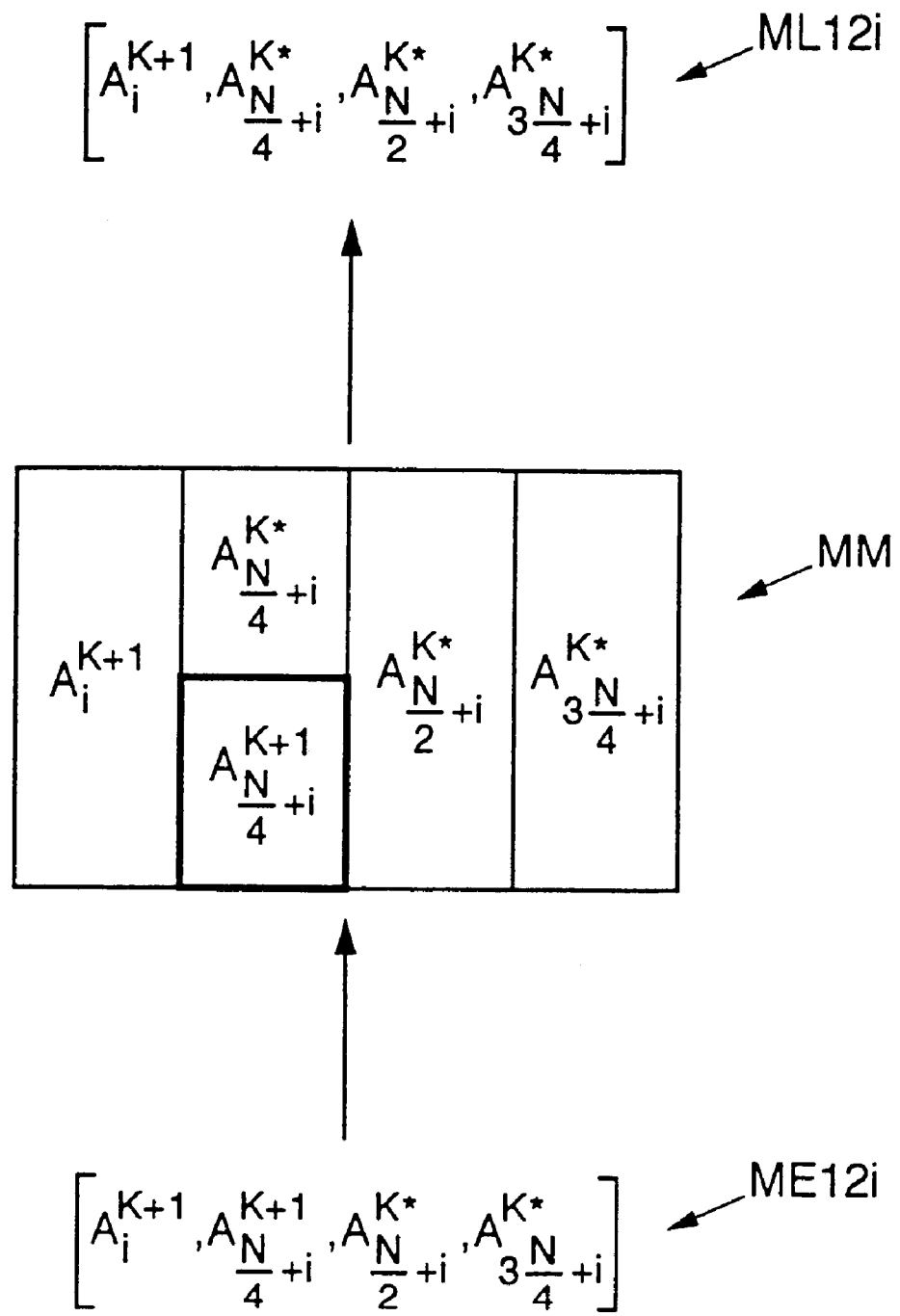
Figure 7C:
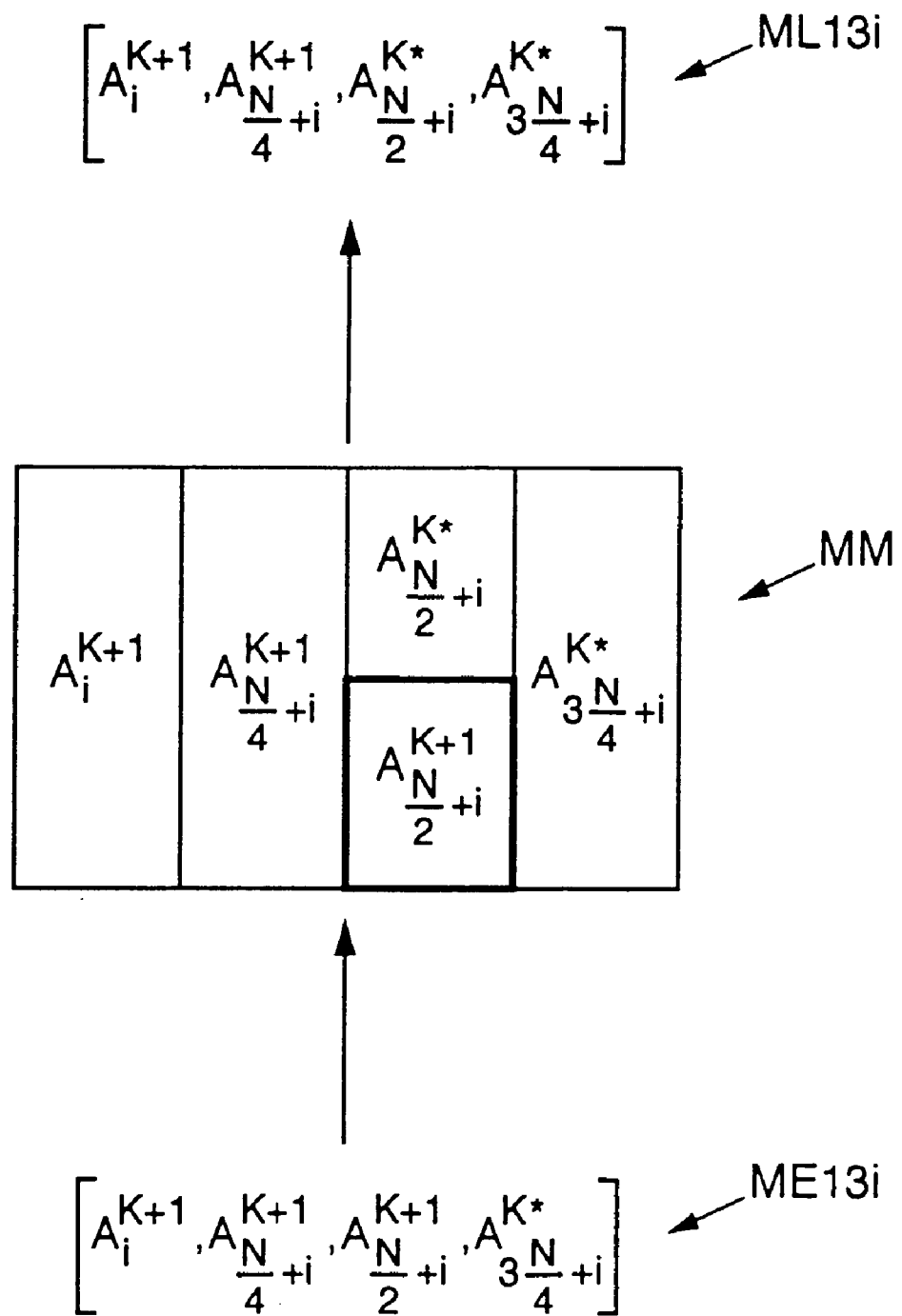
Figure 7D:
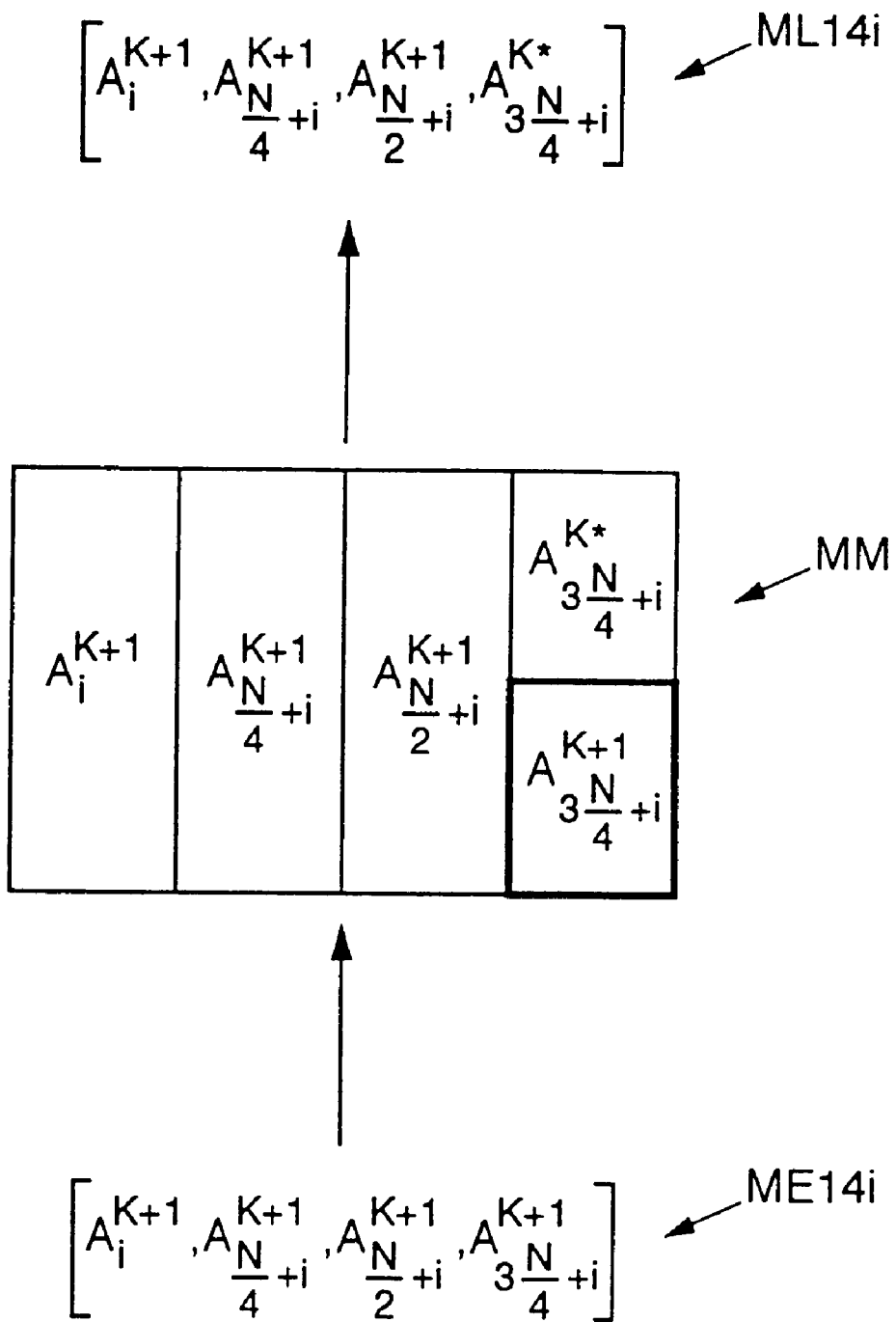

FIGS. 6a and 6b represent the timing diagram corresponding to the processing of blocks $BA^0$ and $BA^1$ in the input stage in accordance with the mode of operation described with reference to FIG. 4. In these figures, the line REG2 represents the valid content output by the register REG2, thus explaining the rightward shift by one clock cycle relative to the value of the counter WRC.

The guard data is assumed to consist of three data bits X, X, X. To take account of the guard interval, it is necessary to replace in the words ME2, ME3, ML3 and ML4, as shown in FIG. 4, the index i by the index (i+x) modulo N/4, where x denotes the number of data bits of the guard interval. This is performed for each cycle of the counter WRC, which ranges from 0 to N/2–1, and beginning with each rise of the signal STBL.

In contrast, the words ME2, ME3, ML3 and ML4, as shown in FIG. 4, remain exact while the counter WRC is self-reinitialized to 0 during reception of the first datum of the guard interval. This is done without the signal STBL having transitioned to a 1 state.

This is illustrated clearly in the timing diagrams of FIGS. 6a and 6b in which the first counting cycle of the counter WRC from 0 to 15 (FIG. 6a) corresponds to an initial phase of writing to the memory MM. When it is necessary to perform within a radix 4 processing stage, an evaluation of the dynamic range of the data is performed to realign these data bits. The storage capacity of the memory MM is increased by one column. Likewise, the storage capacity of registers REG1 and REG2 are increased by one datum. The hardware architecture of such a processing stage is analogous to that illustrated in FIG. 4. One skilled in the art will readily be able to modify the multiplexers, as well as the associated control and addressing of the memory MM. This is with respect to the mode of operation, and in filling the matrix. The filling of the memory is described in greater detail below, while referring to FIGS. 7a to 7d.

Generally, in this embodiment, the memory MM stores all the data of the four segments of a current block K. It is assumed that this has been carried out just before the step illustrated in FIG. 7a. As the data of the first segment of the next block K+1 are received, the words ML11i containing the data of the four segments of block K are read. This is performed while the words ME11i containing the data of the first segment of the next block K+1, as well as the intermediate data of the last three intermediate segments of block K, are stored in the memory MM. The reading of the data of the four segments of block K allows for the data to be realigned in a known manner. For example, realignment is achieved by dividing by the maximum value the intermediate data, having subsequently been computed with respect to the realigned data. For purposes of simplification, these means of computing dynamic range and of realignment have not been represented. The data of the first segment of the next block K+1 are substituted in the first column for the data of the first segment of block K. At the same time, the intermediate data of the last three intermediate segments of block K are substituted in the other three columns of the matrix for the data of the last three segments of block K.

In the next step (FIG. 7b), while the counter is counting from N/4 to N/2–1, the words ML12i are removed from the memory and the data of the second segment of the next block K+1 are substituted for the intermediate data of the second segment of block K. The other intermediate data are rewritten to the memory MM (write words ME12i). This operation is repeated for the third and fourth segments of block K+1 (FIG. 7c, FIG. 7d) with the words ML13i, ME13i and ML14i and ME14i. On completion of the step represented in FIG. 7d, the memory contains all the data of the next block K+1. This allows a new computation on the realigned data.

Another embodiment of the invention which is of particular interest with respect to electrical power consumption is described in the following paragraphs. According to this embodiment, the memory MM is partitioned to access only the useful part. As was illustrated in the previously discussed embodiments, the information extracted from the storage means and not used by the adder/subtracter module or the multiplier module is redelivered to the elementary storage means. This embodiment of the invention eliminates such extractions and having to restore the information by providing provisions for the elementary storage means of a processing stage of a first type (without realignment of the data) to comprise three distinct elementary memories. Each distinct elementary memory has a storage capacity equal to N/4 data bits so to store N/4 words of a datum. This is performed while the elementary storage means of a processing stage of a second type (with realignment of the data) comprises 4 distinct elementary memories. Each distinct elementary memory has a storage capacity equal to N/4 data bits for storing N/4 words of a datum. Moreover, these distinct elementary memories are selectable and addressable selectively in a read mode and in a write mode.

Everything described above with respect to the operation of the elementary processing means of a radix 4 processing stage also applies to the present embodiment. According to this embodiment, the control means of such a radix 4 processing stage selects and addresses selectively in a read mode at least one of the elementary memories. The control means also addresses selectively in a write mode at least one of the elementary memories. Reading and writing is performed at the same address in each of the selected elementary memories. This is done to selectively deliver to the elementary memories the data stored in at least the first three segments of the current block as they are received. Some of the stored data of the current block are respectively and selectively substituted with the intermediate data contained in the last three intermediate segments.

Depending on the case, all the elementary memories can be addressed in a read mode and in a write mode at the same time. It is also possible to address one of the elementary memories in a read mode and the same memory in a write mode. It is even possible to address one of the elementary memories in a read mode and another elementary memory in a write mode. However, the read and write address will be identical for each of the elementary memories selected.

The value of the first counter WRC determines which elementary memories are to be selected and addressed in a write mode. The value of the second counter RDC determines which elementary memories are to be selected and addressed in a read mode. The operation of the device according to this embodiment of the invention will now be described in greater detail while referring to FIGS. 4, 6*a*, 6*b* and 8.

Figure 8:
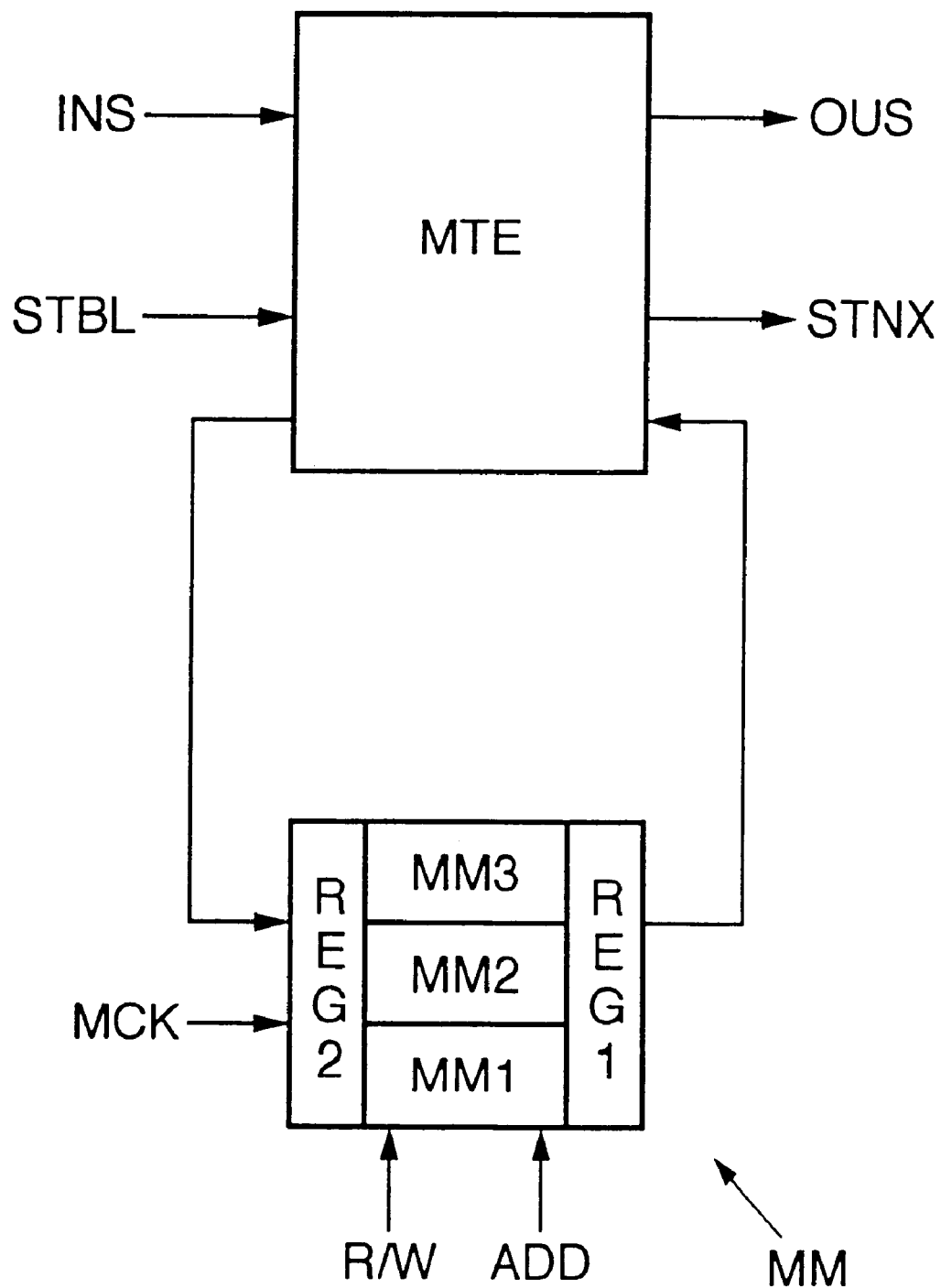
FIG. 8 illustrates another embodiment that provides for a subdivision of the elementary storage means, according to the present invention.

It is assumed that the processing stage is a processing stage of the first type, i.e., without realignment of the data. In this case, as illustrated in FIG. 8, the elementary storage means of the processing stage MM are formed of three distinct memories MM1, MM2 and MM3, for example, of the straightforward access type. It is also assumed that the first datum of each of the words ME1*i*–ME4*i* is stored in the first elementary memory MM1 while the second and third data of these write words are stored respectively in the second and third elementary memories MM2 and MM3. Likewise, the first, second and third data of each of the read words ML1*i*–ML4*i* are read respectively from the first, second and third elementary memories MM1, MM2 and MM3.

The write or read address in these elementary memories is defined by the address counter ADD which is a counter modulo N/4. The control of the multiplexers MX1 and MX2 by the value of the counters WRC and RDC is analogous to the description previously provided for the other embodiments of the invention. When the counter RDC is counting from 0 to N/4−1, the three elementary memories are addressed in read mode and the three data bits of the word ML1*i* are read at the address defined by the counter ADD. When the counter RDC is counting from N/4 to N/2−1, the first elementary memory MM1 is addressed in read mode and the first datum of the word ML2*i* is read at the address defined by the counter ADD, i.e., datum $A_{N/4+i}^{K^*}$. When the counter RDC is counting from N/2 to 3N/4−1, the second elementary memory MM2 is addressed in a read mode only to read therefrom the second datum of the word ML3*i*. Finally, when the counter RDC is counting from 3N/4 to N−1, the third elementary memory MM3 is addressed to read therefrom the third datum of the word ML4*i* at the address defined by the counter ADD.

In parallel with this, when the counter WRC is counting from 3N/4 to N−1, the three memories MM1–MM3 are addressed in a write mode to respectively store therein the three data bits of the word ME1*i*. The storage address is the same for the three elementary memories, and is also the same as the read address of the memories selected by the counter RDC. When the counter WRC is counting from 0 to N/4−1, the first elementary memory MM1 is addressed in write mode only to store therein the first datum of the word ME2*i*. When the counter WRC is counting from N/4 to N/2−1, the second elementary memory MM2 is addressed in write mode to store therein the second datum of the word ME3*i*. When the counter WRC is counting from N/2 to 3N/4−1, the third elementary memory is addressed in write mode only to store therein the third datum of the word ME4*i*.

Furthermore, in a general manner, during the course of a cycle, the elementary memory or memories designated by the value of the counter RDC will be addressed in a read mode. The data or datum will be read from these memories at the address defined by the value of the counter ADD. Then the memory or memories designated by the value of the counter WRC will be write-addressed, and the corresponding data or datum will be written to these selected memories at the same address as the read address.

When a guard interval is present, it is necessary for the control means to be able to store the write address on receipt of the first datum of each block. That is, on the rise of the signal STBL. The control means will then reuse this address when the value of the first counter WRC reaches the value 3N/4. In other words, the address of the start of each symbol written (the address of the first datum of each block) is stored, and this address will be searched when the counter WRC reaches the value 3N/4.

Everything just described above applies also to the operation of a processing stage of the second type, i.e., with realignment of the data. The general operation of the processing stage of the second type has been described with reference to FIGS. 7*a* to 7*b*. The number of elementary memories is then equal to four.

The above discussion generalizes to electronic devices for computing Fourier transforms of large initial size. Thus, in digital television applications in which it is necessary to perform 8192-point Fourier transforms, six radix 4 stages are provided, followed by a conventional radix 2 terminal stage. The first radix 4 stage (input stage) does not perform any realignment of data, but the other stages do perform this realignment operation. If a dual-access memory is used instead of a single-access memory, the frequency of the clock signal MCK would be equal to the frequency of the clock signal SMCK as long as the imaginary and real parts of each datum are received at each cycle of the signal SMCK. The read address of the memory MM would then be equal to the write address minus 1.

That which is claimed is:

1. An electronic device having a pipelined architecture for computing a Fourier transform, the electronic device comprising:
   at least one processing stage with radix equal to 4 and comprising
      an elementary processor for performing a Fourier transform of elementary size equal to 4 on data blocks, and
      an elementary storage circuit comprising a random access memory connected to said elementary process or and having a storage capacity equal to 3N/4 data bits; N being the size of each data block processed by said at least one processing stage.

2. An electronic device according to claim 1, wherein said random access memory comprises a single-access memory.

3. An electronic device according to claim 1, wherein said elementary processor respectively performs N/4 butterfly processing operations on N/4 distinct groups of four data bits for each data block processed by said at least one processing stage.

4. An electronic device according to claim 1, wherein said elementary storage circuit further comprises n registers connected to said random access memory, said random access memory for storing (N/4)−(n−1) words of three data bits, each of said n registers for storing 1 word comprising three data bits.

5. An electronic device according to claim 4, wherein said random access memory comprises a single-access memory.

6. An electronic device according to claim 1, wherein said at least one processing stage comprises at least one second processing stage comprising:
   an elementary storage circuit having a storage capacity equal to N data bits, N being the size of each data block processed by said at least one second processing stage; and
   an elementary processor for determining a dynamic range of a data of each data block processed and for performing a realignment of the data with respect to the determined dynamic range.

7. An electronic device according to claim 6, wherein said elementary storage circuit comprises:
   a random access memory; and n registers connected to said random access memory, said random access memory for storing (N/4)−(n−1) words of four data bits, each of said n registers for storing 1 word comprising four data bits.

8. An electronic device according to claim 7, wherein said random access memory comprises a single-access memory.

9. An electronic device according to claim 1, wherein said at least one processing stage comprises an input for sequentially receiving N data bits of a current data block at a frequency of a first clock signal, the N data bits being ordered within four consecutive segments each comprising N/4 data bits, each datum of a segment forming a group of four data bits together with a counterpart data bit of the other three segments; and wherein said elementary processor comprises an adder/subtracter module for performing at each cycle of the first clock signal a butterfly processing operation on each group of four data bits formed for deriving successive groups of four intermediate data bits respectively ordered within four consecutive intermediate segments, and a multiplier module for multiplying at each cycle of the first clock signal the intermediate data bits by predetermined multiplier coefficients.

10. An electronic device according to claim 9, further comprising control means for providing to said elementary storage circuit data contained in at least a first three segments of the current data block as the data are received, and for replacing a portion of data stored in said elementary storage circuit by intermediate data contained in a last three intermediate segments, and for redelivering at each cycle of the first clock signal data removed from said elementary storage circuit and data not used by said adder/subtracter module or said multiplier module.

11. An electronic device according to claim 10, wherein said control means further comprising means for providing to said elementary storage circuit data contained in a first three segments of a current data block as the data are received, and for respectively replacing data stored in said elementary storage circuit by intermediate data contained in a last three intermediate segments as data contained in a fourth segment are received.

12. An electronic device according to claim 10, wherein said control means further comprises means for providing to said elementary storage circuit data contained in a fourth segment of a current data block as the data are received, and for respectively replacing data contained in a last three segments of the current block stored in said elementary storage circuit by intermediate data contained in a last three intermediate segments as the data contained in a first segment of a next data block are received.

13. An electronic device according to claim 10, wherein said elementary storage circuit comprises:

a first and a second register; and a first and a second controllable multiplexer;

wherein said first register is connected to an output of said elementary storage circuit, an output of said first register is connected to an input of said second register by said first controllable multiplexer, the output of said first register is connected to an input of said adder/subtracter module, the output of said first register is connected to an input of said multiplier module by said second controllable multiplexer, said second register is connected to an input of said elementary storage circuit, an output of said adder/subtracter module is connected to the input of said first register by said first multiplexer and to an input of said multiplier module by said second multiplexer.

14. An electronic device according to claim 13, wherein said control means comprises a first counter modulo N being clocked by the first clock signal for reinitializing on reception of a first datum of each data block, and for controlling said first multiplexer; a second counter modulo N being clocked by the first clock signal for reinitializing on transmission of a first output datum from said at least one processing stage, and for controlling said second multiplexer; and wherein said elementary processor comprises means for addressing said elementary storage circuit comprising a counter modulo N/4−1.

15. An electronic device according to claim 1, wherein said elementary storage circuit comprising a plurality of distinct elementary memories each having a storage capacity equal to N/4 data bits for storing N/4 words of a datum, N being the size of the data blocks processed by said at least one processing stage, and said distinct elementary memories being selectable and selectively addressable in a read mode and in a write mode.

16. An electronic device according to claim 15, wherein said elementary storage circuit comprises three distinct elementary memories.

17. An electronic device according to claim 15, wherein said elementary storage circuit comprises four distinct elementary memories.

18. An electronic device according to claim 15, wherein each of said at least one processing stage comprises an input for sequentially receiving N data bits of a current data block at a frequency of a first clock signal, the N data bits being ordered within four consecutive segments each comprising N/4 data bits, each datum of a segment forming a group of four data bits together with a counterpart data bit of the other three segments; and wherein said elementary processor comprises an adder/subtracter module for performing at each cycle of the first clock signal a butterfly processing operation on each group of four data bits formed for deriving successive groups of four intermediate data bits respectively ordered within four consecutive intermediate segments, and a multiplier module for multiplying at each cycle of the first clock signal the intermediate data bits by predetermined multiplier coefficients.

19. An electronic device according to claim 18, further comprising control means for selecting and selectively addressing in a read mode at least one of said elementary memories, and for selecting and selectively addressing in a write mode at least one of said elementary memories, reading and writing being performed at a same address in each of said selected elementary memories to selectively deliver to said elementary memories data contained in at least the first three segments of the current data block as they are received, and respectively and selectively substituting a portion of the stored data of the current data block with the intermediate data contained in the last three intermediate segments.

20. An electronic device according to claim 19, wherein said control means comprises a first counter modulo N being clocked by the first clock signal for reinitializing on reception of a first datum of each data block; a second counter modulo N being clocked by the first clock signal for reinitializing on transmission of a first output datum from said at least one processing stage, a value of said first counter module determines which of said elementary memories are to be selected and addressed in a write mode while a value of the second counter modulo determines which of said elementary memories are to be selected and addressed in a read mode.

21. An electronic device according to claim 20, wherein said control means further comprises two multiplexers; and wherein said first counter modulo N controls said first multiplexer and said second counter modulo N controls said second multiplexer.

22. An electronic device according to claim 21, wherein said elementary processor comprises means for addressing said elementary memories comprising a counter modulo N/4 having a value defining a write and/or a read address in at least one of said selected elementary memories; and wherein said control means comprises means for storing the write address on reception of the first datum from each current data block and for reusing the write address address when the value of the first counter reaches 3N/4 data bits.

23. An electronic device according to claim 19, wherein said elementary storage circuit comprising:
 a first and a second register; and
 a first and a second controllable multiplexer;
  wherein said first register is connected to the output of said elementary memories, an output of said first register is connected to an input of said second register by said first controllable multiplexer, the output of said first register is connected to an input of said adder/subtracter module, the output of said first register is connected to an input of said multiplier module by said second controllable multiplexer, said second register is connected to an input of said elementary memories, an output of said adder/subtracter module is connected to the input of said first register by said first multiplexer and to the input of said multiplier module by said second multiplexer.

24. An electronic device having a pipelined architecture for computing a Fourier transform, the electronic device comprising:
 at least one first processing stage with radix equal to 4 and comprising
  an elementary processor for performing a Fourier transform of elementary size equal to 4 on received data blocks, wherein said elementary processor respectively performs N/4 butterfly processing operations on N/4 distinct groups of four data bits for each data block, and
  an elementary storage circuit having a storage capacity equal to 3N/4 data bits, N being the size of each data block processed by said at least one first processing stage, said elementary storage circuit comprising a random access memory.

25. An electronic device according to claim 24, wherein said random access memory comprises a single access memory, and wherein said elementary storage circuit further comprises n registers connected to said single access memory, said single access memory for storing (N/4)−(n−1) words of three data bits, each of said n registers for storing 1 word comprising three data bits.

26. An electronic device according to claim 24, wherein said at least one first processing stage comprises an input for sequentially receiving N data bits of a current data block at a frequency of a first clock signal, the N data bits being ordered within four consecutive segments each comprising N/4 data bits, each datum of a segment forming a group of four data bits together with a counterpart data bit of the other three segments; and wherein said elementary processor comprises an adder/subtracter module for performing at each cycle of the first clock signal a butterfly processing operation on each group of four data bits formed for deriving successive groups of four intermediate data bits respectively ordered within four consecutive intermediate segments, and a multiplier module for multiplying at each cycle of the first clock signal the intermediate data bits by predetermined multiplier coefficients.

27. An electronic device according to claim 26, further comprising control means for providing to said elementary storage circuit data contained in a first three segments of a current data block as the data are received, and for respectively replacing data stored in said elementary storage circuit by intermediate data contained in a last three intermediate segments as data contained in a fourth segment are received.

28. An electronic device according to claim 27, wherein said elementary storage circuit comprises:
 a first and a second register; and
 a first and a second controllable multiplexer;
  wherein said first register is connected to an output of said elementary storage circuit, an output of said first register is connected to an input of said second register by said first controllable multiplexer, the output of said first register is connected to an input of said adder/subtracter module, the output of said first register is connected to an input of said multiplier module by said second controllable multiplexer, said second register is connected to an input of said elementary storage circuit, an output of said adder/subtracter module is connected to the input of said first register by said first multiplexer and to an input of said multiplier module by said second multiplexer.

29. An electronic device according to claim 28, wherein said control means comprises a first counter modulo N being clocked by the first clock signal for reinitializing on reception of a first datum of each data block, and for controlling said first multiplexer; a second counter modulo N being clocked by the first clock signal for reinitializing on transmission of a first output datum from said at least one first processing stage, and for controlling said second multiplexer; and wherein said elementary processor comprises means for addressing said elementary storage circuit comprising a counter modulo N/4−1.

30. An electronic device having a pipelined architecture for computing a Fourier transform, the electronic device comprising:
 at least one second processing stage with radix equal to 4 and comprising
  an elementary processor for performing a Fourier transform of elementary size equal to 4 on received data blocks, wherein said elementary processor respectively performs N/4 butterfly processing operations on N/4 distinct groups of four data bits for each data block, and for determining a dynamic range of a data bit of each data block processed and for performing a realignment of the data with respect to the determined dynamic range, and
  an elementary storage circuit having a storage capacity equal to N data bits, N being the size of each data block processed by said at least one second processing stage, said elementary storage circuit comprising a random access memory.

31. An electronic device according to claim 30, wherein the random access memory comprises a single access memory; and wherein said elementary storage circuit further comprises n registers connected to said single access memory, said single access memory for storing (N/4)−(n−1) words of four data bits, each of said n registers for storing 1 word comprising four data bits.

32. An electronic device according to claim 30, wherein said at least one second processing stage comprises an input for sequentially receiving N data bits of a current data block at a frequency of a first clock signal, the N data bits being ordered within four consecutive segments each comprising N/4 data bits, each datum of a segment forming a group of four data bits together with a counterpart data bit of the other three segments; and wherein said elementary processor comprises an adder/subtracter module for performing at each cycle of the first clock signal a butterfly processing operation on each of group of four data bits formed for deriving successive groups of four intermediate data bits respectively ordered within four consecutive intermediate segments, and a multiplier module for multiplying at each cycle of the first clock signal the intermediate data bits by predetermined multiplier coefficients.

33. An electronic device according to claim 32, further comprising control means for providing to said elementary storage circuit data contained in a fourth segment of a current data block as the data bits are received, and for respectively replacing data contained in a last three segments of the current block stored in said elementary storage circuit by intermediate data bits contained in a last three intermediate segments as the data bits contained in a first segment of a next data block are received.

34. An electronic device according to claim 33, wherein said elementary storage circuit comprises:

a first and a second register; and a first and a second controllable multiplexer;

wherein said first register is connected to an output of said elementary storage circuit, an output of said first register is connected to an input of said second register by said first controllable multiplexer, the output of said first register is connected to an input of said adder/subtracter module, the output of said first register is connected to an input of said multiplier module by said second controllable multiplexer, an output of said adder/subtracter module is connected to the input of said first register by said first multiplexer and to an input of said multiplier module by said second multiplexer.

35. An electronic device according to claim 34, wherein said control means comprises a first counter modulo N being clocked by the first clock signal for reinitializing on reception of a first datum of each data block, and for controlling said first multiplexer; and a second counter modulo N being clocked by the first clock signal for reinitializing on transmission of a first output datum from said at least one second processing stage, and for controlling said second multiplexer; and wherein said elementary processor comprises means for addressing said elementary storage circuit comprising a counter modulo N/4−1.

36. A method for controlling a radix 4 processing stage of a device having a pipelined architecture for computing a Fourier transform, the method comprising the steps of:

receiving at least one data block comprising N data bits;

storing 3N/4 data bits of the at least one data block in a random access memory; and performing a Fourier transform of elementary size equal to 4 on at least one data block.

37. A method according to claim 36, wherein the processing stage has an input for sequentially receiving the N data bits of the at least one data block and orders the N data bits within four consecutive segments, each segment comprising N/4 data bits and each datum of a segment forming a group of four data bits together with a counterpart data bit of the other three segments; and wherein the storing comprises storing data contained in a first three segments in the random access memory as the N data bits are received; and wherein the processing comprises processing the group of four data bits using a butterfly operation responsive to receiving data for the fourth segment for deriving successive groups of four intermediate data bits respectively ordered within four consecutive intermediate segments, and replacing data stored in the random access memory by a respective intermediate data contained in a last three intermediate segments.

38. A method according to claim 36, wherein the random access memory comprises a single-access memory.

39. A method for controlling a radix 4 processing stage of a device having pipelined architecture for computing a Fourier transform, the method comprising the steps of:

receiving at least one data block comprising N data bits;

storing N data bits of the at least one data block in a random access memory;

performing a Fourier transform of elementary size equal to 4 on the at least one data block;

determining a dynamic range of a data bit of each data block processed; and performing a realignment of the data with respect to the determined dynamic range.

40. A method according to claim 39, wherein the processing stage has an input for sequentially receiving the N data bits of the at least one data block, and orders the N data bits within four consecutive segments, each segment comprising N/4 data bits, each datum of a segment forming a group of four data bits together with a counterpart data bit of the other three segments; and wherein the storing comprise s storing data contained in a fourth segment in the random access memory as the data are received; and wherein the processing comprises processing the group of four data bits using a butterfly operation, and replacing data stored in a first segment of a next data block received, and respectively replacing data contained in a last three segments of a current block stored in the random access memory by intermediate data contained in a last three intermediate segments.

41. A method according to claim 39, wherein the random access memory comprises a single-access memory.

* * * * *

UNITED STATES PATENT AND TRADEMARK OFFICE
CERTIFICATE OF CORRECTION

PATENT NO.    : 6,408,319 B1
DATED         : June 18, 2002
INVENTOR(S)   : Joel Cambonie It is certified that error appears in the above-identified patent and that said Letters Patent is hereby corrected as shown below:

Column 1,
Line 32, delete "art" insert -- art. --

Column 3,
Line 57, delete "he" insert -- the --

Column 5,
Line 32, delete "multipling" insert -- multiplying --

Column 7,
Line 43, delete "butter-fly" insert -- butterfly --

Line 65, Delete: "$A_{3N/4+i}^{K*} = A_i^K -j\, A_{N/4+i}^K - A_{N/2+i}^K -j\, A_{3N/4+i}^K$."
Insert: -- $A_{3N/4+i}^{K*} = A_i^K -j\, A_{N/4+i}^K - A_{N/2+i}^K -j\, A_{3N/4+i}^K$. --

Column 9,
Line 10, delete "multipling" insert -- multiplying --
Line 43, delete "Futheremore" insert -- Futhermore --

Column 14,
Lines 35-36, delete "process or" insert -- processor --.

Column 20,
Line 36, delete "block, and" insert -- block and --
Line 41, delete "s storing" insert -- storing --

Signed and Sealed this

Twenty-third Day of March, 2004

JON W. DUDAS
*Acting Director of the United States Patent and Trademark Office*